United States Patent [19]

Brooks et al.

[11] 4,293,904
[45] Oct. 6, 1981

[54] POWER FREQUENCY CONVERTER

[75] Inventors: James L. Brooks, Oxnard, Calif.;
James C. Bowers; Harry A. Nienhaus,
both of Tampa, Fla.

[73] Assignee: The United States of America as
represented by the Secretary of the
Navy, Washington, D.C.

[21] Appl. No.: 97,028

[22] Filed: Nov. 21, 1979

[51] Int. Cl.³ .................... H02M 5/45; H02M 5/458
[52] U.S. Cl. .................................. 363/86; 323/266;
323/282; 363/136
[58] Field of Search ................ 323/17, DIG. 1, 266,
323/282; 363/24–26, 86, 89, 96–98, 124, 136

[56] References Cited

U.S. PATENT DOCUMENTS

| | | | |
|---|---|---|---|
| 3,365,650 | 1/1968 | Camp et al. | 323/DIG. 1 |
| 3,514,688 | 5/1970 | Martin | 363/97 |
| 4,034,280 | 7/1977 | Cronin et al. | 363/124 X |
| 4,042,856 | 8/1977 | Steigerwald | 323/DIG. 1 |
| 4,054,843 | 10/1977 | Hamada | 323/DIG. 1 |
| 4,190,882 | 2/1980 | Chevalier et al. | 363/26 |

Primary Examiner—A. D. Pellinen
Attorney, Agent, or Firm—Richard S. Sciascia; Joseph M. St. Amand; William C. Daubenspeck

[57] ABSTRACT

A power converter which provides precise waveshape regulation. An input power waveform (three-phase or single phase power) is rectified and modulated to form a chopped waveform within an envelope defined by the rectified input waveform. The modulation is removed by passing the chopped signal through a low-pass filter. The output of the low-pass filter, which is equal to the instantaneous value of the chopped waveform envelope times the instantaneous value of the duty cycle of the chopped waveform, is converted to a complete sine wave output voltage in a power inverter. The output of the power inverter is sampled and compared with a low-power reference waveform in a differential amplifier. The output of the differential amplifier is phase compensated for the effects of the low-pass filter and applied as an error signal to a pulse-width-modulated oscillator to adjust the duty cycle of the chopped waveform so that the sine wave output voltage follows the reference waveform.

14 Claims, 7 Drawing Figures

POWER FREQUENCY CONVERTER

BACKGROUND OF THE INVENTION

This invention relates generally to frequency regulation techniques and, more particularly, to precise frequency control of power waveforms.

The American electric power generation and distribution system is a very stable system in regard to frequency control. Historically, the frequency fluctuations have always been small, rarely exceeding 0.1 Hz. As a consequence, American electronic equipment designers assume that a reliable, closely regulated source of power is available to the user. This is usually true in the continental United States. However, when American-made electronic equipment is used in foreign countries, and in particular, small foreign countries where the power systems are often overloaded and poorly regulated, it does not function properly. Power system frequency fluctuations as large as 2 Hz have been observed in at least one small foreign nation, resulting in the Navy station there having to switch completely to standby diesel generators as often as twice a day. In addition, many European countries use 50 Hz powder instead of the 60 Hz American standard. Therefore, for American military equipment deployed world-wide, power frequency converters are often required to fulfill the assigned mission.

In the conventional power frequency converter system, unregulated AC power is first converted to DC power by an input rectifier and low-pass filter combination. This DC power is then regulated by a DC switching regulator and converted to AC power at the desired frequency by a power switching inverter. Power switching in the regulator and inverter are necessary to minimize power losses in the system. A low-pass filter on the output removes harmonic distortion generated in the power inverter. The desired frequency stability is achieved by driving the power inverter with a crystal oscillator. The desired output amplitude regulation is obtained with the DC switching regulator. The feedback signal for this regulator is derived by rectifying and filtering the system output voltage. This feedback signal is compared to a DC reference in the regulator to obtain an error signal to control the regulator chopper duty cycle.

The major problem associated with the conventional system is the size of the inductors and capacitors required for input and output low-pass filters. The size of the output filter can be greatly reduced but only at the expense of a great increase in the complexity of the power inverter. For example, the simplest type of power inverter is the push-pull square wave inverter which requires a relatively large output filter to remove the odd harmonics in the square wave. More elaborate power inverter circuits can be used to eliminate or reduce the undesired harmonics and thereby reduce the size of the output filter required.

SUMMARY OF THE INVENTION

It is therefore an object of the present invention to provide precise frequency regulation of high-power AC waveforms.

Another object of the present invention is to provide a power frequency converter which does not require large inductors and capacitors for input and output low-pass filters.

Another object of the present invention is to provide a power frequency converter in which the output filter requirements are reduced without adding to the complexity of the power inverter.

A further object of the present invention is to provide a power frequency converter in which switching losses and transients are minimized.

According to the present invention, an input waveform, either three-phase or single-phase power, is rectified to provide a pulsating DC signal which is then chopped at a relatively high frequency (for example, 20 KHz) to effectively destroy the form of the input power wave. The power wave is then reconstructed in the desired form by varying the duty cycle of the chopper and passing the chopped waveform through a low-pass filter which eliminates the high-frequency components. The output of the low-pass filter, which is equal to the instantaneous value of the chopped waveform envelope times the instantaneous value of the chopper duty cycle, is coupled to a power inverter. The power inverter converts its input which resembles a full-wave rectified waveshape to a complete sine wave at its output. An error signal is derived by comparing the output of the power inverter to a reference waveshape. This error signal controls the duty cycle of the chopped waveform so that the output of the power inverter is a high power waveform which follows to the reference waveform.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
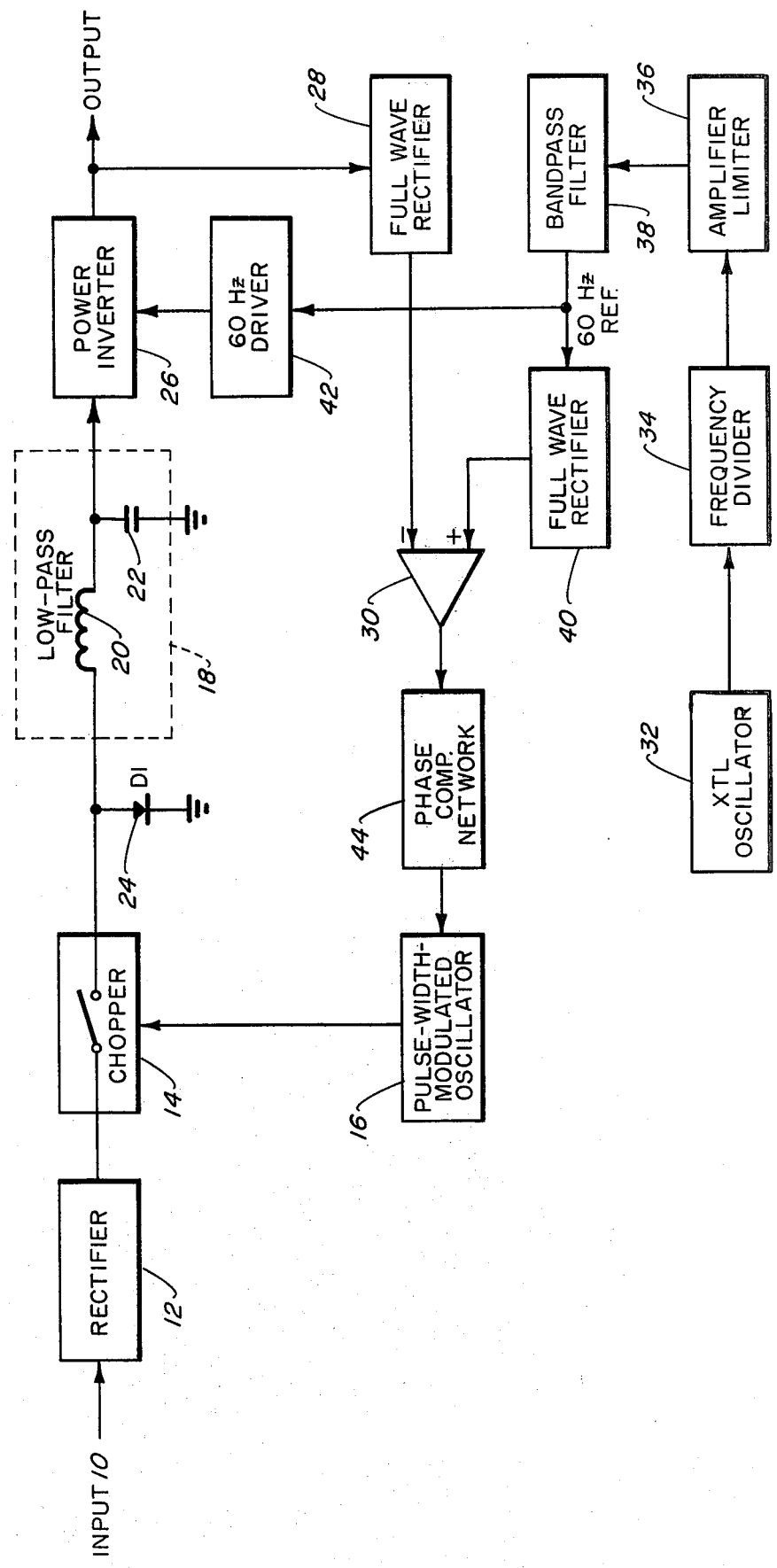
FIG. 1 is a schematic block diagram of an embodiment of the present invention.

Referring now to the drawing and, in particular to FIG. 1, which illustrates the preferred embodiment of the invention, a three-phase or single-phase power signal 10 is coupled to a rectifier 12 (half-wave or full-wave, depending on whether the input is a three-phase or a single-phase power signal) to provide a pulsating DC waveform at the output of rectifier 12. The pulsating DC signal is coupled to a solid state power switch (chopper) 14 which has its control input coupled to the output of a pulse-width-modulated oscillation 16. The power switch 14 is alternately turned on and off by the pulse-width-modulated oscillator 16 to convert the pulsating DC input to a pulse waveform.

The output of the chopper 14 is coupled to a low-pass filter 18 such as a two-pole LC filter including inductor 20 and capacitor 22. The low-pass filter 18 removes the chopper frequency from the pulse waveform while not attenuating the significant frequency components of the full-wave rectified output. A reversed-biased diode 24 is coupled between the chopper output and ground to provide a current path for the low-pass filter 18 when the chopper 14 is non-conducting.

Figure 3:
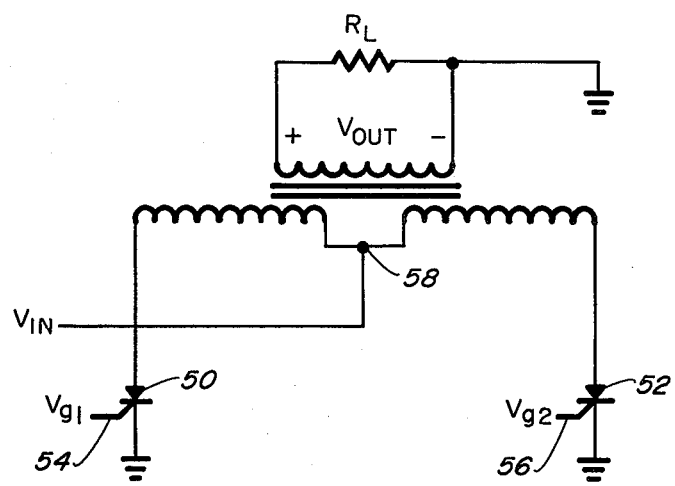
FIG. 3 illustrates a prior art power inverter suitable for use in the present invention.

The output of the low-pass filter 18 is fed to power inverter 26, such as a conventional prior art push-pull power switching inverter shown in FIG. 3. The power inverter 26 conconverts the full-wave rectified waveform from the low-pass filter 18 into the desired AC output signal (system output).

A feedback signal is derived from the system output and a reference signal having the desired frequency. The output of the power inverter 26 is coupled to a full-wave rectifier 28 and then fed to the negative input of a DC differential amplifier 30. The positive input to the differential amplifier 30 is derived from output of a reference oscillator 32. For example, if a 60 Hz system output is required, the reference signal may be derived from a crystal oscillator having a frequency which is a convenient multiple of 60 Hz (since 60 Hz crystals are not available). The output of oscillator 32 is fed through a frequency divider 34, amplitude controlled by amplitude limiter 36, and the 60 Hz component extracted by a band-pass filter 38. The output of the band-pass filter 38 is coupled through a full-wave rectifier 40 and applied to the positive input to the differential amplifier 30. The output of the bandpass filter 38 is also fed to a reference driver 42 which has its output coupled to the power inverter 26 for providing trigger pulses for switching the inverter.

The output of the differential amplifier 30 after passing through a phase compensation network 44 which ideally reduces the phase shift around the feedback loop to zero, is coupled to the pulse-width-modulated oscillator 16 to control the duty cycle of the oscillator.

The operation of the system of FIG. 1 will now be described for the case where the input power signal 10 is 120 VAC±10%, 60 Hz±3.3% three-phase power and the desired system output signal is 60 Hz±0.01% single-phase. The three-phase 60 Hz input signal 10 is half-wave rectified in rectifier 12 to provide the pulsed DC waveform shown in FIG. 2 which is fed to the chopper switch 14. The pulsed DC waveform is chopped by switch 14 at a frequency determined by the pulse-width-modulated oscillator 16. The frequency of the pulse-width-modulated oscillator and thus the chopper 14 is chosen as a compromise between conflicting requirements. The chopper frequency should be as large as possible in order to minimize the phase shift due to the low-pass filter 18 for two reasons. First, the net phase shift around the feedback loop (including that due to the phase compensation network 44) should be approximately zero for all significant frequency components so that the feedback signal has the proper phase. Second, the phase shift due to the low-pass filter 18 can cause the input waveforms to the power inverter 26 and the trigger pulses from the reference driver 42 to be out of phase causing the power inverter to switch at other than the optimum time. These two-phase difference problems are the most probable source of distortion in the output of the system. A large chopper frequency also reduces the size of the filter components. On the other hand, if the chopper frequency is too large, switching losses in the chopper 14 may become excessive. A 20 KHz frequency is a practical compromise between these conflicting requirements.

The 20 KHz chopper frequency is removed from the chopper output by the low-pass filter 18. At the same time, low-pass filter 18 does not alter the significant frequency components of the desired full-wave rectified output. The output of the low-pass filter 18 is equal to the instantaneous average value of the chopped input, which is equal to the instantaneous value of the chopped waveform times the instantaneous value of the chopper duty cycle. The combination of the pulse-width-modulated chopper 14 and the averaging low-pass filter 18 functions as a time division multiplier.

With no feedback error signal present, the unmodulated pulse-width-modulated oscillator 16 produces a chopper duty cycle of one-half. With chopper duty cycle of one-half, the output amplitude of the low-pass filter 18 is one-half of the input amplitude to the chopper 14. To compensate for this attenuation, a step-up transformer is required to maintain the output voltage at the proper level. This step-up may be accomplished in the power transformer in the power inverter 26 (see FIG. 3), in a power transformer in the input rectifier 12, or in an input power transformer (not shown) coupled before the chopper 14.

The system output and the reference signal (60 Hz in this case) are full-wave rectified in rectifiers 28 and 40, respectively, and compared in differential amplifier 30 to provide negative feedback. A feedback error signal is developed at the output of the differential amplifier 30 whenever the instantaneous values of these two signals differ.

The negative feedback in the system is such that when the system output is too large, the error signal causes the instantaneous chopper duty cycle and the instantaneous system output to decrease until the error signal is driven to some arbitrarily small magnitude which is determined by the gain of the feedback loop. If the system output is too small, the error signal causes the instantaneous duty cycle and the instantaneous system output to increase until the error signal is driven toward zero. In this manner, the system output is forced to follow the 60 Hz reference value.

Figure 2:
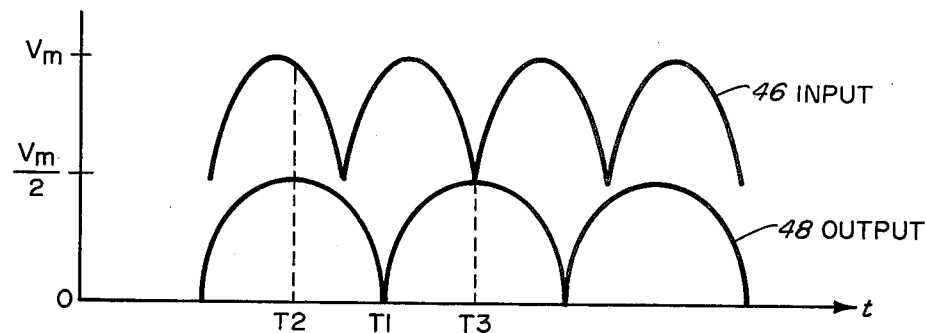
FIG. 2 illustrates the waveform of the input to the chopper and the waveform of the output of the low-pass filter for a three-phase input power signal.

For illustrative purposes, consider the input waveform 46 to the chopper 14 and output waveform 48 of low-pass filter 18 shown in FIG. 2 for the case where input waveform is derived from a three-phase half-wave rectifier and Vm is the peak amplitude of the input waveform 46. At time T1, both the instantaneous output voltage and chopper duty cycle must be zero. At time T2, the instantaneous output voltage is equal to one-half the input voltage, the error signal is zero, and the chopper duty cycle is equal to one-half.

At time T3, the instantaneous values of the input and output voltages must be equal and the chopper duty cycle must be unity.

This illustrates an important point. The chopper input voltage must never be allowed to fall below the desired filter output voltage since the chopper duty cycle will be limited to unity and the filter output will simply follow the input during this time. Since the phase and frequency of the chopper input and filter output waveforms differ, this implies that the chopper input voltage must never be allowed to fall below the peak value of the desired filter output voltage. Other than this, there are no theoretical restrictions on the chopper input waveform. As illustrated in FIG. 2, this restriction presents no problem with a three-phase rectified input and no input filtering is required. However, with a single-phase input signal 10, fullwave rectification and some filtering is required to prevent the regulator input voltage from falling below VM/2 (the peak output amplitude) during a portion of the cycle. In a computer simulation of the system with a single-phase input, a capacitor filter of 7000 uf was used for this purpose. It should be noted that this filter is not designed to remove the ripple at the chopper input, but simply to limit it to an acceptable value. A much larger filter would be required to convert the chopper input to a relatively pure DC.

Figure 4A:
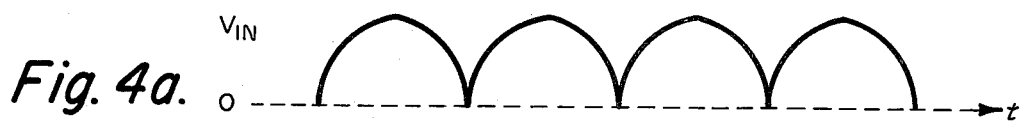
FIGS. 4a–4d are waveforms illustrating the operation of the power inverter.
Figure 4B:
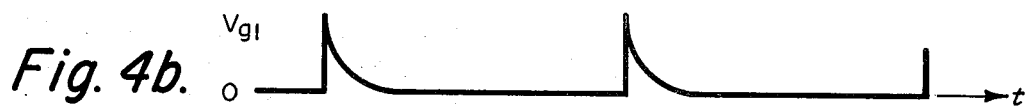
Figure 4C:
Figure 4D:
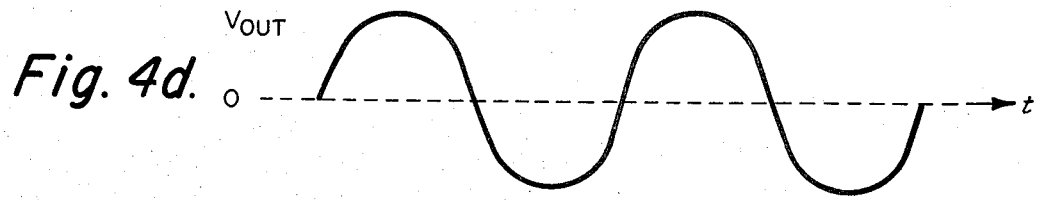

The output of the low-pass filter 18, which resembles a full-wave rectifed waveshape with precisely controlled frequency, is coupled to the power inverter 26. One suitable power inverter, which utilizes two silicon-controlled rectifiers (SCR's) 50 and 52 in a push-pull arrangement, is shown in FIG. 3. The waveforms for the power inverter are illustrated in FIG. 4. Trigger pulses Vg1 and Vg2 (FIGS. 4b and 4c) which are 180° out of phase are derived in the reference driver 42 from the 60 Hz reference and are coupled to the control inputs 54 and 56 of SCR 50 and 52, respectively. The SCR's 50 and 52 are triggered so that the two halves of the transformer primary 58 are alternately switched to ground. These trigger pulses are in synchronism with the full-wave rectified 60 Hz input from low-pass filter 18 (FIG. 4a), which is applied to the center tap of the primary 58, since all three signals are derived from the same reference. Turn-off of the SCR's with no trigger input occurs automatically at the zero points of the input waveform so that a commutating capacitor is not required. The fact that switching occurs when the input voltage is near zero means that switching transients and power losses are minimized. The output of the power inverter is shown in FIG. 4d.

The system output is full-wave rectified at 28 and compared to the full-wave rectified 60 Hz reference in the differential amplifier 30 to provide the error signal which controls the duty cycle of the pulse-width-modulated oscillator 16. The phase compensation network 44 compensates for the phase shift due to the low-pass filter 18. The two-pole LC filter shown in FIG. 1 was chosen for the high-frequency filtering because more complex filters introduce additional phase-shift to the system, thus making phase compensation at 44 more complicated and making stability problems in the feedback loop more severe.

Most of the system elements shown in the drawing are conventional and well known to those skilled in the art. However, further discussion of certain elements in the preferred embodiment is beneficial. The solid-state powerswitch 14 is the most critical component in the system. Ideally, chopper 14 should be easy to turn on or off. In addition to being able to handle twice the full RMS load current, it must have a breakdown voltage in excess of the peak system input voltage. Because the primary source of power losses in the system is expected to be chopper switching losses, it must have switching times which are small in comparison to the chopper period. Also, its "on" resistance must be much less than the load resistance to minimize system power losses. Based on these considerations, the following specifications are applicable for a 120 V, 100 amp system:

Breakdown voltage: 200 V minimum
Current: 200 amp RMS maximum
Switching speed: 1μ sec. maximum
On resistance: 0.01Ω maximum The most promising devices for chopper applications at this time are VMOS FET's, gate turn off thryistors (GTO's) and bipolar junction transistors (BJT's). VMOS FET's are extremely easy to turn on or off and exceed the switching speed requirements of this system. However, the present state of the art in the areas of current handling (10 amp) and voltage breakdown (90 V) is presently much less than that required for the system. These devices are considered promising because it is generally easier to increase the current handling and voltage breakdown capability of a device than it is to increase the device speed. This improvement is usually made at the expense of switching speed but VMOS devices have plenty of speed to spare. They are presently used at 50 KHz chopper frequencies in DC switching regulator applications. VMOS devices can be operated in parallel to increase their current handling capability.

GTO's have been fabricated which meet or exceed all of the required specifications except the switching speed. The switching speed of these devices is at least an order of magnitude slower than that required by the system, and it is extremely doubtful whether any significant improvement can be made in this area in the near future.

The 2N5928, presently being modeled at the University of South Florida, probably comes closer than any present BJT to meeting the chopper requirements, except breakdown voltage (120 V). It has a peak current rating of 150a and specified switching speeds of 2.5 to 5.5 μsec. It's ON resistance is less than required. In addition to low breakdown voltages, a major disadvantage of BJT power switches in this application is that it takes a significant amount of base drive power to turn them on.

With regard to the power inverter 26, the voltage breakdown requirement for the SCR's in the power inverter is the same as for the chopper switch 14, but the current handling requirement is cut in half because of the 50 percent operating duty cycle of these devices. Switching speeds are not overly critical in this application, as they are in the chopper, and present state of the art SCR switching speeds are adequate. SCR's are available to meet all of these requirements.

Those skilled in the art will recognize the major advantages of the present invention over the conventional AC to DC to AC system. In the present invention, the large input and output filters have both been eliminated. A small output filter may still be required as a practical matter to remove switching transients and distortion due to hardware limitations. If only single phase power is available, some filtering of the full-wave rectified waveform is required to prevent the input voltage from falling below the desired output voltage during a portion of the input cycle. However, input filter requirements are reduced substantially, since peak to peak ripple in the input filter can be as much as 50 percent of the peak input voltage (with a capacitor filter).

The reduction in the output filter requirements in the present invention is accomplished without adding to the complexity of the power inverter. Because the full-wave input to the power inverter 26 is zero when the inverter switches, switching losses and transients are minimized. This zero voltage switching also makes turn-off of the thyrister switching device much easier to achieve than in a power inverter with a DC input. Those skilled in the art will also recognize that the present invention may be used at frequencies other than those discussed previously. The present invention may, for example, be used to convert 50 Hz power to 60 Hz power or 60 Hz power to convert 400 Hz power.

Although the present invention has been described herein with regard to a preferred embodiment directed to a power frequency converter, the technique is much broader than this application. For example, a DC to AC power inverter may be provided by eliminating the input rectifiers (and associated input power transformer). The major advantages in this application of the present technique are (1) no requirement for output filters, (2) automatic amplitude regulation of output voltage and (3) low power inverter switching losses and transients.

Another application is that of an active high-power filter having a frequency response approximately an ideal bandpass filter with transient suppression. In this application, the reference signal would be derived from the input signal through the use of conventional phase-locked loop techniques. The input waveform in this case is filtered in a large filter capacitor (approximately 7000 uf) before being full-wave rectified prior to being chopped (as is required in the case of a power frequency converter having a single-phase input signal).

Obviously, many modifications and variations of the present invention are possible in light of the above teachings. It is therefore to be understood that within the scope of the appended claims the invention may be practiced otherwise than as specifically described.

What is claimed is:

1. A power converter for receiving an input power signal and providing an AC output signal having a precisely regulated waveform comprising:
    means for chopping a pulsating DC input signal at a chopper frequency to effectively destroy the form of of the input power wave and to provide a chopped signal at an output, said means for chopping being controllable for adjusting the duty cycle of said means for chopping, the input of said means for chopping coupled to receive said input power signal;
    filter means having its input coupled to the output of said means for chopping for receiving the chopped output signal, said filter means removing the chopper frequency from its input signal; the input voltage to said means for chopping never being less than the desired peak output voltage of said filter means;
    power inverter switching means for converting a DC signal at its input to an AC signal at its output, said power inverter means having its input coupled to the output of said filter means, the AC signal at the output of said power inverter switching means being said AC signal having a precisely regulated waveform;
    means for providing a reference signal having the waveform of the desired AC output signal, said reference signal being coupled to said power inverter switching means for controlling the switching thereof;
    means for comparing the reference signal with the AC output signal from said power inverter means switching to produce an error signal related to the difference therebetween, said means for comparing including:
    differential amplifier means having a first input coupled to the output of said power inverter switching means, a second input coupled to said means of providing a reference signal, and an output; said differential amplifier means providing a signal related to the difference between its two inputs at its output; and
    pulse-width-modulated oscillator means coupled to receive the output of said differential amplifier means for adjusting the duty cycle of said pulse-width-modulated oscillator means, the output of said pulse-width-modulated oscillator means being coupled to said means for chopping to adjust the duty cycle of said means for chopping;
    phase compensation means coupled between said differential amplifier means and said pulse-width-modulated oscillator means for adjusting the phase of the output signal from said differential amplifier means; the waveform of the AC output signal of said power inverter switching means thereby being adjusted so that the error signal is driven toward zero, whereby the AC output waveform follows the waveform of the reference signal.

2. Apparatus as recited in claim 1 wherein said power inverter switching means includes two silicon-controlled rectifiers in a push-pull arrangement, said silicon-controlled rectifiers being triggered by signals derived from said reference signal.

3. Apparatus as recited in claim 2 wherein said means for comparing further includes:
    first full-wave rectifier means coupled between said means for providing a reference and the second input to said differential amplifier means; and
    second full-wave rectifier means coupled between the output of said power inverter switching means and the first input to said differential amplifier means.

4. Apparatus as recited in claim 3 wherein said means for chopping includes:
    solid-state switching means alternately turned on and off to provide said chopped signal; and
    further comprising means for providing a current path to ground for said filter means when said solid-state switching means is turned off.

5. Apparatus as recited in claim 1 further comprising means for rectifying an AC signal coupled to receive said input power signal at its input, the output of said means for rectifying an AC signal being coupled to the input of said means for chopping.

6. Apparatus as recited in claim 1 wherein said means for providing a reference signal includes means for providing a reference signal having a desired frequency.

7. Apparatus as recited in claim 1 wherein said means for providing a reference signal includes a phase-locked loop coupled to said input power signal so that said reference signal follows the phase of said input power signal.

8. A power frequency converter receiving an input power signal and providing an output power waveform having a precisely regulated frequency comprising:
    means for chopping a pulsating DC input signal at a chopper frequency to effectively destroy the form of the input power wave and to provide a chopped signal at an output, said means for chopping being controllable for adjusting the duty cycle of said means for chopping;
    filter means having its input coupled to the output of said means for chopping for receiving the chopped output signal, said filter means removing the chopper frequency from its input signal; the input voltage to said means for chopping not being less than the desired peak output voltage of said filter means;
    power inverter switching means for converting a DC signal at its input to an AC signal at its output, said power inverter switching means having its input coupled to the output of said filter means, the output of said power switching inverter being said output power waveform;

means for providing a reference signal having the frequency of the desired output power waveform; said reference signal being coupled to said inverter means for controlling the switching thereof; and means for comparing the frequency of the reference signal with the frequency of the output power waveform to produce an error signal related to the difference therebetween, said means for comparing including:

differential amplifier means having a first input coupled to the output of said power inverter switching means, a second input coupled to said means of providing a reference signal, and an output; said differential amplifier means providing a signal related to the difference between its two inputs at its output; and pulse-width-modulated oscillator means coupled to receive the output of said differential amplifier means for adjusting the duty cycle of said pulse-width-modulated oscillator means, the output of said pulse-width-modulated oscillator means being coupled to said means for chopping to adjust the duty cycle of said means for chopping;

phase compensation means coupled between said differential amplifier means and said pulse-width-modulated oscillator means for adjusting the phase of the output signal from said differential amplifier means;

the frequency of the output power waveform thereby being adjusted so that the error signal is driven toward zero, whereby the frequency of the output power waveform follows the frequency of the reference signal.

9. Apparatus as recited in claim 8 wherein said power inverter switching means includes two silicon-controlled rectifiers in a push-pull arrangement, said silicon-controlled rectifiers being triggered by signals derived from said reference signal.

10. Apparatus as recited in claim 9 wherein said means for comparing further includes:

first full-wave rectifier means coupled between said means for providing a reference and the second input to said differential amplifier means; and second full-wave rectifier means coupled between the output of said power inverter switching means and the first input to said differential amplifier means.

11. Apparatus as recited in claim 8 wherein said means for chopping includes:

solid-state switching means alternately turned on and off to provide said chopped signal; and further comprising means for providing a current path to ground for said filter means when said solid-state switching means is turned off.

12. Apparatus as recited in claim 8 further comprising means for rectifying an AC signal coupled to receive said input power signal at its input, the output of said means for rectifying an AC signal being coupled to the input of said means for chopping.

13. Apparatus as recited in claim 12 wherein said input power signal is a three-phase AC signal and said rectifier means includes three-phase, half-wave rectifier means.

14. Apparatus as recited in claim 12 wherein said input power signal is a single-phase AC signal and said rectifier means includes a single-phase, full-wave rectifier means.

* * * * *